(12) United States Patent
Wang et al.

(10) Patent No.: US 11,989,904 B2
(45) Date of Patent: May 21, 2024

(54) LIQUID PROVIDING SYSTEM

(71) Applicant: PixArt Imaging Inc., Hsin-Chu (TW)

(72) Inventors: Guo-Zhen Wang, Hsin-Chu (TW); Tse-En Peng, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/207,138

(22) Filed: Jun. 8, 2023

(65) Prior Publication Data

US 2023/0326062 A1 Oct. 12, 2023

Related U.S. Application Data

(63) Continuation of application No. 17/368,841, filed on Jul. 7, 2021, now Pat. No. 11,715,226.

(51) Int. Cl.
*G06T 7/62* (2017.01)
*G01F 23/292* (2006.01)
*G01F 23/80* (2022.01)

(52) U.S. Cl.
CPC .............. *G06T 7/62* (2017.01); *G01F 23/292* (2013.01); *G01F 23/802* (2022.01)

(58) Field of Classification Search
CPC ....... G06T 7/62; G01F 23/292; G01F 23/802; G01F 23/2928; H04N 23/00; A47J 31/4457
See application file for complete search history.

(56) References Cited

U.S. PATENT DOCUMENTS

2014/0149265 A1  5/2014  Kundra
2022/0120600 A1* 4/2022  Liu ..................... G01F 23/2928

\* cited by examiner

*Primary Examiner* — Tony Ko
(74) *Attorney, Agent, or Firm* — Winston Hsu

(57) ABSTRACT

A liquid providing system of detecting a target container includes a main body, a holder, an optical sensor and an operational processor. The main body has a supporting platform. The holder is disposed on the supporting platform, and the holder is made by low reflectivity material and adapted to hold the target container. The optical sensor is disposed above the supporting platform and adapted to output a detection image containing the target container and the holder. The operational processor is electrically connected to the optical sensor, and adapted to analyze the detection image and then acquire an effective feature inside the detection image for distinguishing the target container from the holder.

12 Claims, 7 Drawing Sheets

I1(I)

I3(I)

I4(I)

I

I1

Is

LIQUID PROVIDING SYSTEM

CROSS REFERENCE TO RELATED APPLICATIONS

This application is a continuation application of U.S. application Ser. No. 17/368,841, filed on Jul. 7, 2021. The content of the application is incorporated herein by reference.

BACKGROUND OF THE INVENTION

1. Field of the Invention

The present invention relates to a liquid providing system, and more particularly, to a liquid providing system of accurately and rapidly detecting a target container.

2. Description of the Prior Art

The conventional water dispenser cannot detect a liquid level and container property of the container. The user watches the container and controls the button of water dispenser to prevent the water from leakage. The conventional coffee mater may be able to detect whether the container is put in the right position via the proximity sensor or the ultrasonic sensor; however, the proximity sensor and the ultrasonic sensor cannot detect the body property of the container, volume of the container and the liquid surface in the container. Thus, design of a liquid detection device of detecting the volume and the body property of the container and the liquid surface in the container via the optical detection technique for increasing functions of the water dispenser and the coffee maker is an important issue of the related industry.

SUMMARY OF THE INVENTION

The present invention provides a liquid providing system of accurately and rapidly detecting a target container for solving above drawbacks.

According to the claimed invention, a liquid providing system of detecting a target container includes a main body, a holder, an optical sensor and an operational processor. The main body has a supporting platform. The holder is disposed on the supporting platform, and the holder is made by low reflectivity material and adapted to hold the target container. The optical sensor is disposed above the supporting platform and adapted to output a detection image containing the target container and the holder. The operational processor is electrically connected to the optical sensor, and adapted to analyze the detection image and then acquire an effective feature inside the detection image for distinguishing the target container from the holder.

The liquid providing system of detecting a target container includes a main body, a holder, an optical sensor and an operational processor. The main body has a supporting platform. The holder is disposed on the supporting platform, and the holder is made by low reflectivity material and adapted to hold the target container. The optical sensor is disposed above the supporting platform and adapted to output a detection image containing the target container and the holder. The operational processor is electrically connected to the optical sensor, and adapted to analyze the detection image and then acquire an effective feature inside the detection image for distinguishing the target container from the holder.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
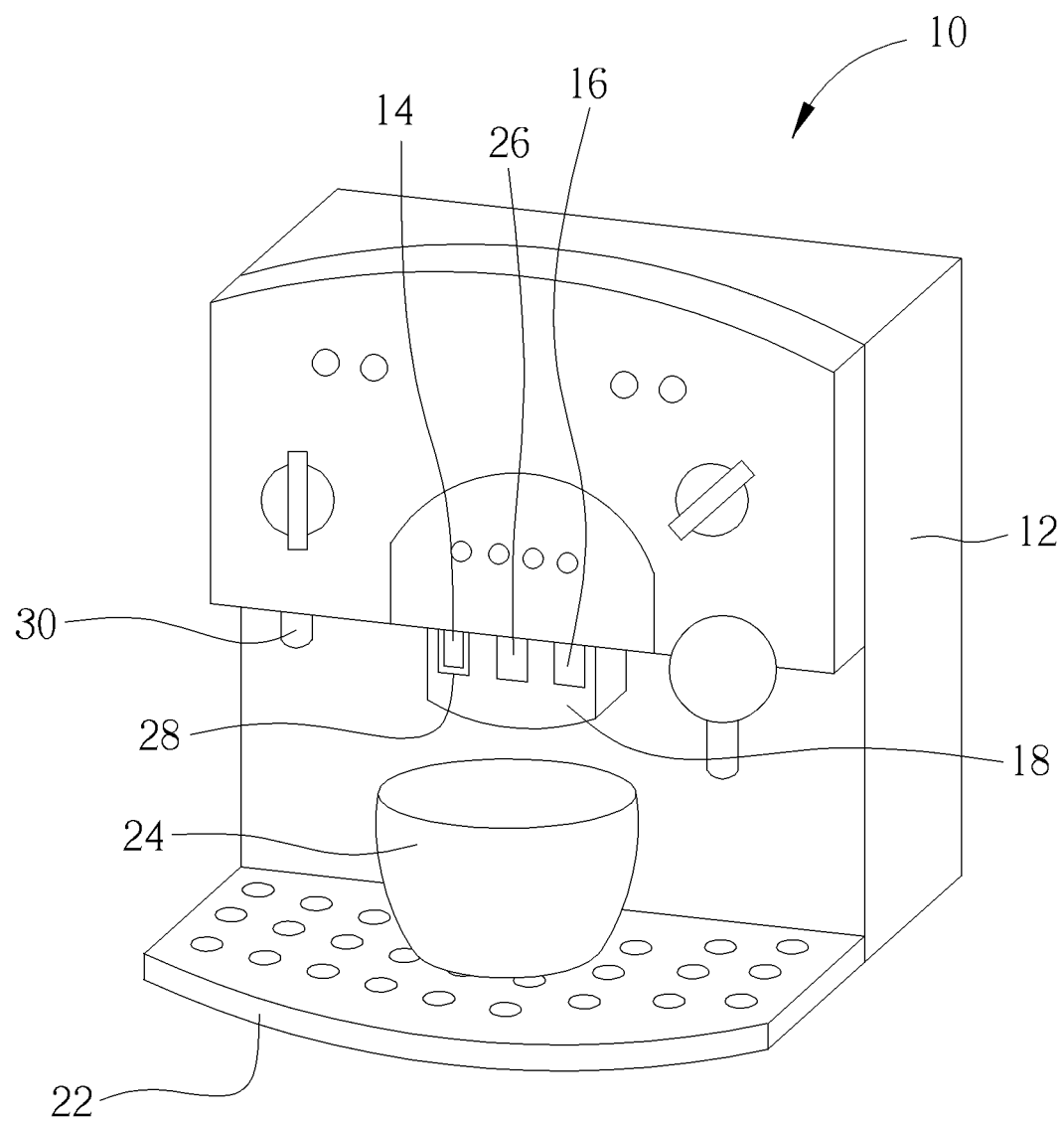
FIG. 1 is a diagram of a liquid providing system according to a first embodiment of the present invention.
Figure 2:
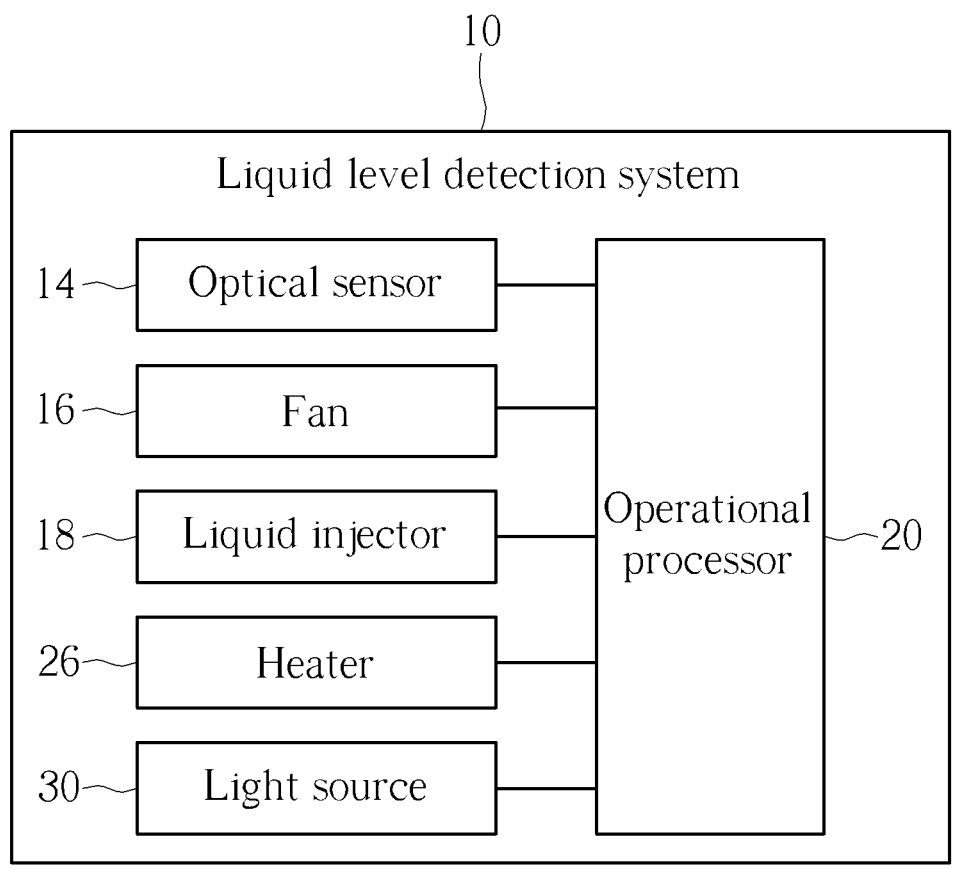
FIG. 2 is a functional block diagram of the liquid providing system according to the first embodiment of the present invention.
Figure 3:
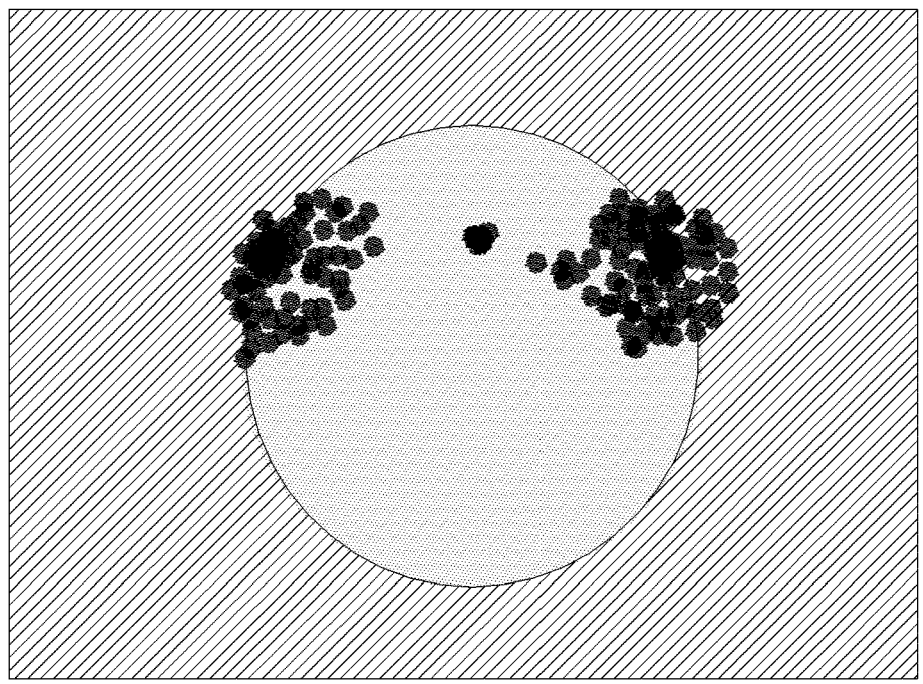
FIG. 3 and FIG. 4 are diagrams of detection images acquired by the liquid providing system in different situations according to the first embodiment of the present invention.
Figure 4:
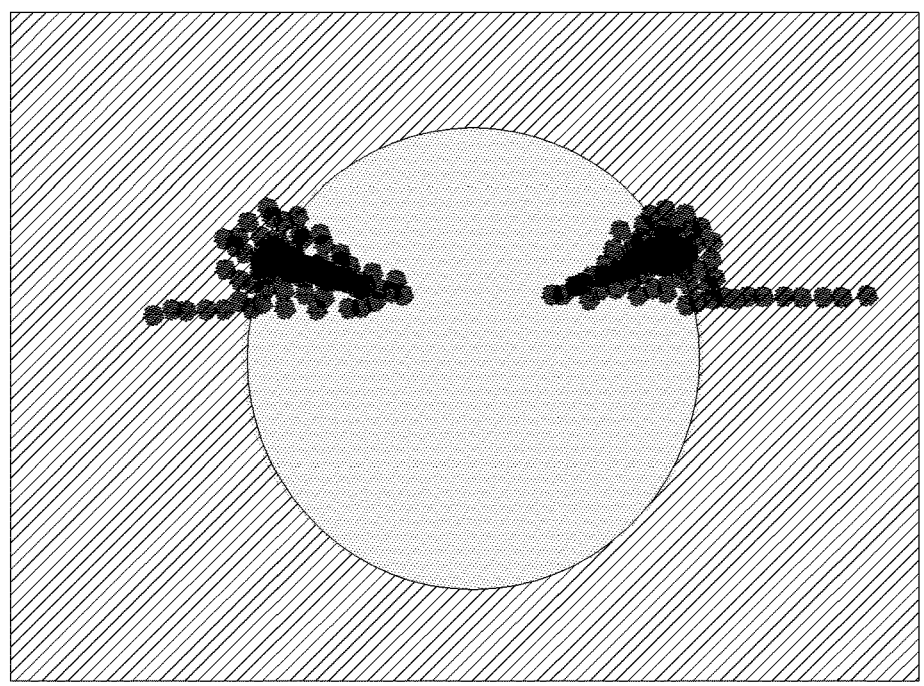

Please refer to FIG. 1 to FIG. 4. FIG. 1 is a diagram of a liquid providing system 10 according to a first embodiment of the present invention. FIG. 2 is a functional block diagram of the liquid providing system 10 according to the first embodiment of the present invention. FIG. 3 and FIG. 4 are diagrams of detection images acquired by the liquid providing system 10 in different situations according to the first embodiment of the present invention. The liquid providing system 10 can include a main body 12, an optical sensor 14, a fan 16, a liquid injector 18 and an operational processor 20. The main body 12 can have a supporting platform 22 whereon the target container 24 can be disposed. The optical sensor 14 and the liquid injector 18 can be disposed on the main body 12 and adjacent to each other, and can be located above the supporting platform 22. The fan 16 can be disposed on the main body 12, and further on position adjacent to the optical sensor 14 or under the optical sensor 14. Any position of the fan 16 capable of facing the supporting platform 22 belongs to a scope of the present invention.

The liquid injector 18 can inject liquid into the target container 24. The optical sensor 14 can output the detection image I containing the target container 24. The operational processor 20 can be electrically connected to the optical sensor 14, the fan 16 and the liquid injector 18. The operational processor 20 can analyze the detection image I to acquire at least one feature of the target container 24, so as to determine liquid level information of the target container 24. However, if the liquid has high temperature liquid and the fan 16 is shut down, the optical sensor 14 is surrounded by hot steam so that the detection image I generated by the optical sensor 14 has the blurry feature.

Thus, the operational processor 20 can actuate the fan 16, and analyze the detection image 12 generated during an operation period of the fan 16, so as to acquire an effective feature of the target container 24 inside the detection image 12, and further to accurately determine the liquid level information of the target container 24.

In the present invention, the fan 16 can optionally provide an attraction force or an exhaust force to remove gaseous matter around the supporting platform 22, and therefore the optical sensor 14 can acquire the clear detection image I without interference of the hot steam; further, the fan 16 may alternately provide the attraction force and exhaust force. Any mode of the fan 16 capable of removing the gaseous matter around the supporting platform 22 rapidly and effectively belongs to the scope of the present invention.

When the optical sensor 14 generates the detection image I, the operational processor 20 can immediately analyze and determine whether the detection image I has the blurry feature or the clear feature. If the optical sensor 14 generates the detection image I1 having low image quality, the operational processor 20 can actuate the fan 16, or increase a wind force of the fan 16 in response to the actuated fan 16; if the optical sensor 14 generates the detection image 12 having preferred image quality, the operational processor 20 can shut down the fan 16, or decrease the wind force of the fan 16 in response to the actuated fan 16.

Besides, the liquid providing system 10 may optionally dispose a temperature sensor (which is not shown in the figures) on the main body 12. The temperature sensor can be electrically connected to the operational processor 20 and located above the supporting platform 22, and used to detect variation of the environmental temperature resulted from the target container 24. If the environmental temperature acquired by the temperature sensor is greater than a predefined temperature value, the liquid inside the target container 24 has hot temperature, and the operational processor 20 can actuate the fan 16 or increase the wind force of the fan 16; if the environmental temperature acquired by the temperature sensor is equal to or smaller than the predefined temperature value, the liquid inside the target container 24 does not have the hot temperature, and the operational processor 20 can shut down the fan 16 or decrease the wind force of the fan 16.

Moreover, the liquid providing system 10 may optionally dispose a heater 26 on the main body 12. The heater 26 can be electrically connected to the operational processor 20, and used to increase the environmental temperature around the supporting platform 22. The heater 26 preferably can be a middle infrared (MIR) heater used to output a heating beam with a wavelength ranged between 2000~4000 nm, and aimed to heat the hot stream for rapid dissipation. The operational processor 20 can determine whether to actuate the heater 26 and decide power level of the actuated heater 26 in accordance with at least one of the image quality of the detection image I and the environmental temperature of the temperature sensor. It should be mentioned that the operational processor 20 can simultaneously actuate the fan 16 and the heater 26, or alternately actuate the fan 16 or the heater 26. Actuation of the fan 16 and the heater 26 can depend on an amount of the hot steam and power supply condition of the liquid providing system 10, and a detailed description is omitted herein for simplicity.

Generally, the liquid providing system 10 can preferably utilize a protector 28 to cover the optical sensor 14, and a defogging layer can be formed on an outer surface of the protector 28. The protector 28 can avoid the image quality of the detection image I acquired by the optical sensor 14 from being interfered by the hot steam. The defogging layer may be formed by polycarbonate or polyester with high hydrophility, and can provide a continuous liquid film on the optical sensor 14 to prevent a beam from being irregularly scattered for increasing clarity of the optical sensor 14. Material of the defogging layer is not limited to the above-mentioned embodiments, and depends on the design demand.

Figure 5:
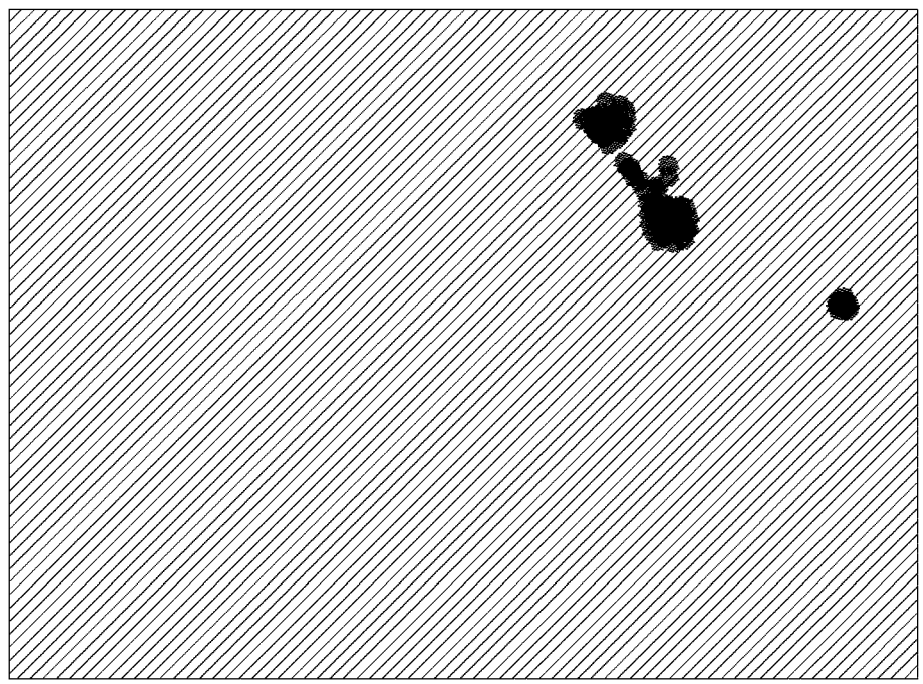
FIG. 5 and FIG. 6 are diagrams of the detection images acquired by the liquid providing system in other situations according to the first embodiment of the present invention.
Figure 6:
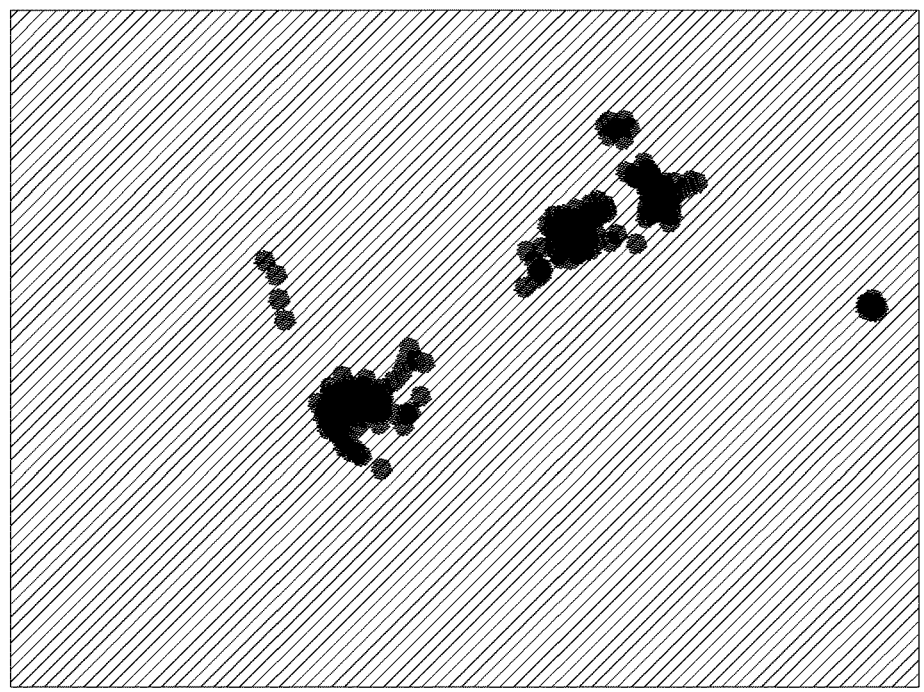

The liquid providing system 10 can further include a light source 30 disposed on the main body 12 and electrically connected to the operational processor 20. The light source 30 can emit an illumination beam toward the supporting platform 22, and the image quality and clarity of the detection image I can be increased accordingly. In other possible embodiment, the liquid providing system 10 may dispose the light source 30 on a lateral side of the main body 12, and the illumination beam emitted by the light source 30 can be projected onto a lateral surface of the target container 24. Please refer to FIG. 5 and FIG. 6. FIG. 5 and FIG. 6 are diagrams of the detection images acquired by the liquid providing system 10 in other situations according to the first embodiment of the present invention. As shown in FIG. 5, if the target container 24 is an opaque container, the detection image 13 acquired by the optical sensor 14 can show an illumination feature which results from the illumination beam on a small part of the lateral surface of the target container 24; as shown in FIG. 6, if the target container 24 is a transparent container, the detection image 14 acquired by the optical sensor 14 can show the illumination feature appeared on a large part of the lateral surface and a middle of the target container 24.

The liquid providing system 10 can utilize the light source 30 to illuminate the lateral surface of the target container 24, and execute image identification via a deep learning method or a reference image comparison method, so as to determine the target container 24 belongs to the transparent container or the opaque container, and to accordingly select a suitable algorithm for accurately acquiring the effective feature of the target container 24 inside the detection image I. The liquid providing system 10 may dispose one light source 30 on the main body 12, and the light source 30 can increase illumination of the target container 24 and classify body property of the target container 24; further, the liquid providing system 10 may optionally dispose two light sources 30 which can respectively increase the illumination of the target container 24 and classify the body property of the target container 24.

Therefore, when the liquid providing system 10 acquires the detection image I, the body property can be detected to classify the illumination feature resulted from the lateral illumination beam inside the detection image I for determining the target container 24 is the opaque container or the transparent container. If the target container 24 is the opaque container, a related exposure algorithm can be applied for computing a rim height and a liquid height of the target container 24, so as to acquire the liquid level information of the target container 24. The said liquid level information may be a ratio of the liquid height to the rim height of the target container 24, which depends on an actual demand. If the target container 24 is the transparent container, a property of the liquid inside the target container 24 can be identified for a start, such as determining the liquid inside the target container 24 being water or coffee, and the related exposure algorithm can be applied for computing the rim height and the liquid height of the target container 24 in accordance with the liquid property, and then the liquid level information of the target container 24 can be acquired.

Figure 7:
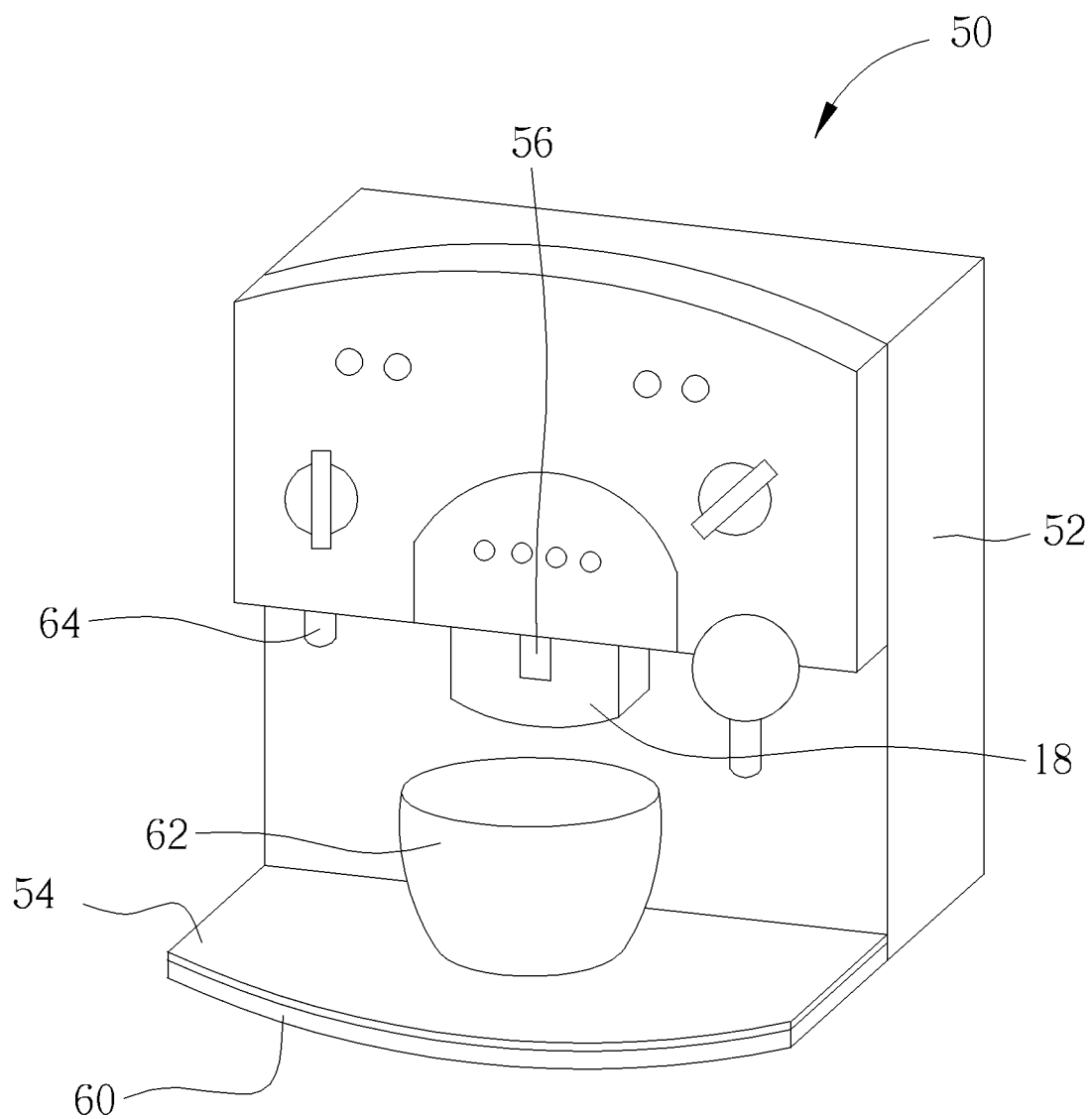
FIG. 7 is a diagram of the liquid providing system according to a second embodiment of the present invention.
Figure 8:
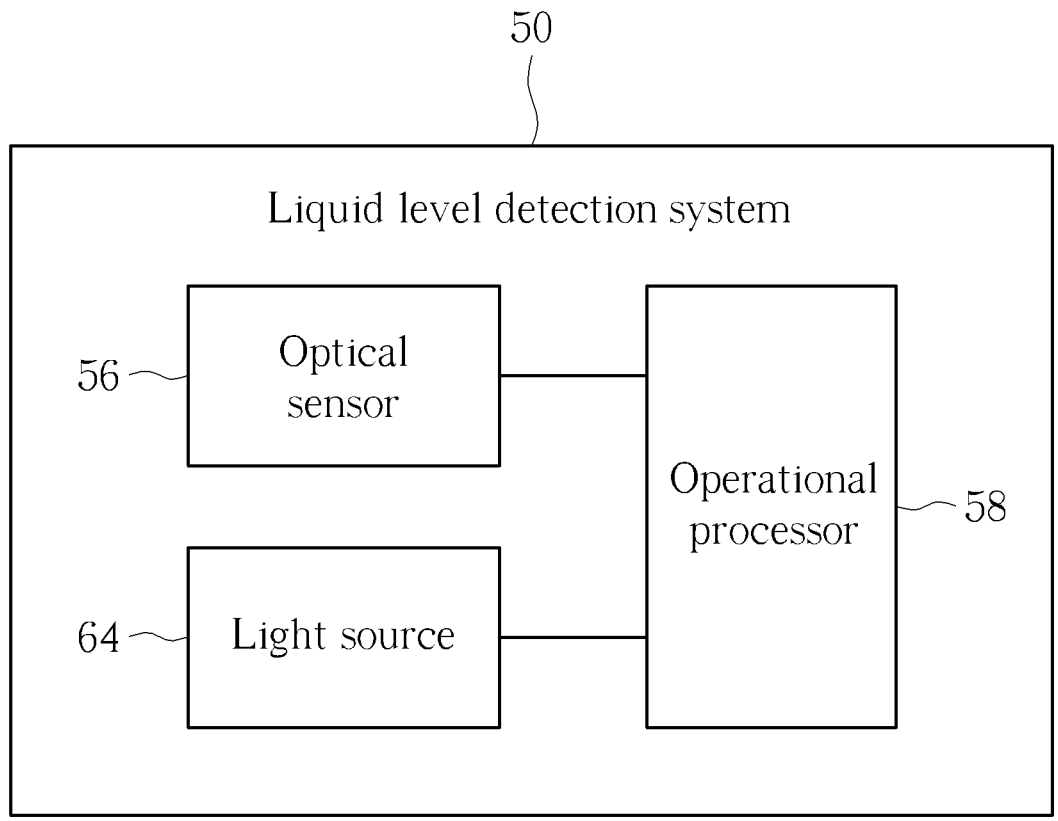
FIG. 8 is a functional block diagram of the liquid providing system according to the second embodiment of the present invention.
Figure 9:
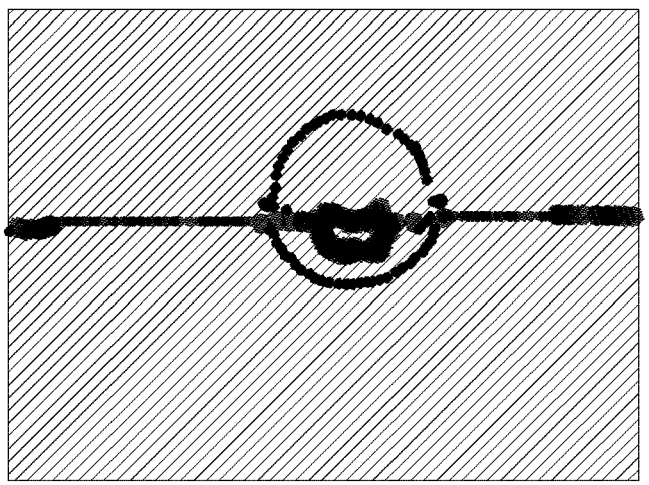
FIG. 9 is a diagram of the detection image acquired by the liquid providing system according to the second embodiment of the present invention.
Figure 10:
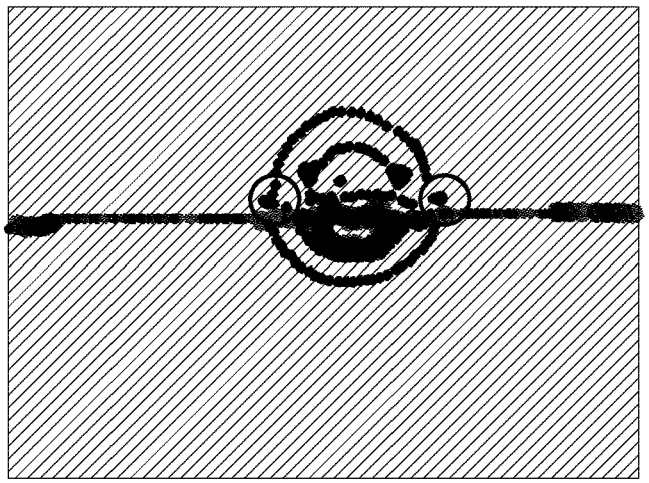
FIG. 10 and FIG. 11 are diagrams of the detection images acquired by the liquid providing system via different exposure parameters according to the second embodiment of the present invention.
Figure 11:
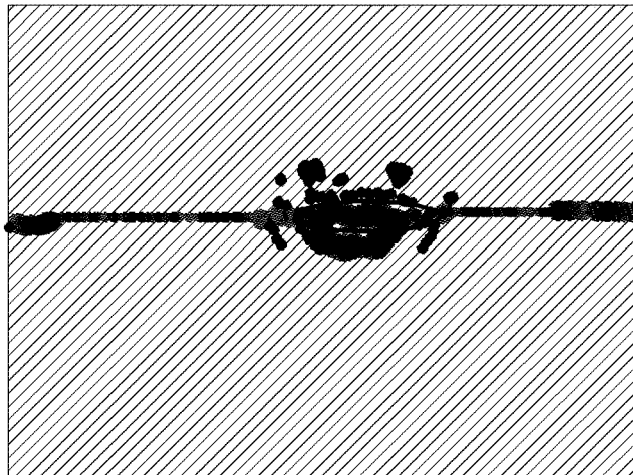

Please refer to FIG. 7 to FIG. 11. FIG. 7 is a diagram of the liquid providing system 50 according to a second embodiment of the present invention. FIG. 8 is a functional block diagram of the liquid providing system 50 according to the second embodiment of the present invention. FIG. 9 is a diagram of the detection image acquired by the liquid providing system 50 according to the second embodiment of the present invention. FIG. 10 and FIG. 11 are diagrams of the detection images acquired by the liquid providing system 50 via different exposure parameters according to the second embodiment of the present invention. The liquid providing system 50 can include a main body 52, a holder 54, an optical sensor 56 and an operational processor 58. The main body 52 can have a supporting platform 60. The holder 54 can be made by low reflectivity material, and disposed on the supporting platform 60 to hold the target container 62. The optical sensor 56 can be disposed above the supporting platform 60, and generate the detection image I containing the target container 62 and the holder 54. The operational processor 58 can be electrically connected to the optical sensor 56 and used to analyze the detection image I, so as to acquire the effective feature inside the detection image I for distinguishing the target container 62 from the holder 54.

The liquid providing system 50 can detect the liquid level information of the target container 62 which is manufactured by transparent material. The supporting platform 60 may be formed via high reflectivity material; if the target container 62 is directly put on the supporting platform 60, the detection image I acquired by the optical sensor 56 can have reflective features of the supporting platform 60 and the target container 62, and the operational processor 58 cannot acquire the correct liquid level information of the target container 62 due to interference of the reflective feature of the supporting platform 60. As shown in FIG. 9, the liquid providing system 50 can put the holder 54 made by the low reflectivity material on the supporting platform 60 to hold the target container 62. The detection image I can contain the effective feature of the target container 62 and the holder 54 only, so as to avoid high reflection interference of the supporting platform 60, and to increase identification accuracy of the detection image I.

Besides, the liquid providing system 50 can further adjust an exposure parameter of the detection image to distinguish the rim from the liquid height of the target container 62, for acquiring the correct liquid level information of the target container 24. The optical sensor 56 can generate a plurality of detection images I in accordance with different exposure parameters; for example, a first detection image I1 may be generated via a first exposure parameter with a large value, and a second detection image Is may be generated via a second exposure parameter with a small value. When the rim and the liquid height of the target container 62 are unknown, the optical sensor 56 can alternately generate the first detection image I1 and the second detection image Is; if the liquid level information is acquired but probably varied, the optical sensor 56 can adjust a number ratio of the first detection image I1 to the second detection image Is in accordance with a detection result, so as to accurately and rapidly acquire the following liquid level information of the target container 24.

For example, the operational processor 58 can compare the acquired liquid height with a predefined height condition, and adjust the number ratio of the first detection image I1 to the second detection image Is during a specific period in accordance with a comparison result. If the liquid height does not conform to or is lower than the predefined height condition, the target container 62 may be empty, and the optical sensor 56 can alternately generate the first detection image I1 and the second detection image Is for image detection. If the liquid height conforms to or is higher than the predefined height condition, the target container 62 is filled with the liquid, and the number of the second detection image Is during the specific period can be increased to find out continuous variation of the liquid level information; the first detection image I1 still can be used to detect the rim for determining whether the target container 62 is moved. It should be mentioned that the optical sensor 56 may only generate the second detection image Is to detect the continuous variation of the liquid level information when the liquid height conforms to or is higher than the predefined height condition.

The target container 62 is made by transparent material; the optical sensor 56 can increase the exposure parameter of the detection image I, so that the liquid providing system 50 can clearly identify the rim of the target container 62 via the first detection image I1 generated by the first exposure parameter. The foresaid rim can be marked by a dotted circle shown in FIG. 10. However, the first detection image I1 generated by the long exposure parameter cannot used to clearly identify the liquid height due to internal reflection of the target container 62, and the liquid providing system 50 can further analyze the second detection image Is generated by the second exposure parameter to identify the liquid height inside the target container 62. Thus, the liquid providing system 50 can adjust the exposure parameter of the detection images to immediately detect the rim and the liquid height of the target container 62.

Actual values of the first exposure parameter and the second exposure parameter may be varied in accordance with the environmental illumination, the auxiliary illumination, the detection efficiency of the optical sensor 56, and the algorithm of the operational processor 58, and a detailed description is omitted herein for simplicity. It should be mentioned that the liquid providing system 50 can optionally set two feature threshold ranges, and compare the image features of the first detection image I1 and the second detection image Is respectively with the two feature threshold ranges. The image feature can be intensity or other parameters of the detection image. If the image feature is greater than the feature threshold range, the detection image has high intensity, and the exposure parameter of the optical sensor 56 can be automatically decreased for preferred image quality. If the image feature is equal to or smaller than the feature threshold range, the detection image has low intensity, and the exposure parameter of the optical sensor 56 can be automatically increased, so that the first detection image I1 and the second detection image Is can be generated via the applicable exposure parameters to provide the effective features for distinguishing the rim from the liquid height of the target container 62.

Besides, the liquid providing system 50 can optionally dispose a light source 64 on the main body 52. The light source 64 can be electrically connected to the operational processor 58. As the first embodiment mentioned above, the light source 64 can emit the illumination beam toward the supporting platform 60. The light source 64 can increase the illumination of the detection image I, and further be used to detect the body property of the target container 62. The liquid providing system 50 can utilize the light source 64 to determine the target container 62 is made by transparent material, and then select the corresponding exposure algorithm to actuate the optical sensor 56 for generating the first detection image I1 and the second detection image Is via different exposure parameters, so as to accurately distinguish the rim from the liquid height of the target container 62.

In conclusion, the liquid providing system of the present invention can utilize at least one of the fan and the heater to remove the hot steam above the target container, to ensure that the detection image acquired by the optical sensor is not interfered. The liquid providing system can further dispose the protector with the defogging layer on the optical sensor, for preventing the quality of the detection image from being interfered by the hot steam. The liquid providing system can preferably dispose the holder made by the low reflectivity material on the supporting platform, and utilize the light source to illuminate the lateral surface of the target container; then, the optical sensor can generate the detection images with different exposure parameters to decide the target container belongs to the transparent container or the opaque container, and select the corresponding exposure algorithm in accordance with the body property, so as to accurately detect the rim and the liquid height of the target container.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid providing system of detecting a target container, the liquid providing system comprising:
    a main body, having a supporting platform;
    a holder disposed on the supporting platform, the holder being made by low reflectivity material and adapted to hold the target container;
    an optical sensor disposed above the supporting platform and adapted to output a detection image containing the target container and the holder; and
    an operational processor electrically connected to the optical sensor, and adapted to analyze the detection image and then acquire an effective feature inside the detection image for distinguishing the target container from the holder.

2. The liquid providing system of claim 1, wherein the optical sensor is spaced from the supporting platform and faces toward the holder to capture the detection image from a top of the target container.

3. The liquid providing system of claim 1, further comprising:
    a light source disposed on the main body and adjacent to the optical sensor and adapted to emit an illumination beam toward the supporting platform.

4. The liquid providing system of claim 3, wherein the illumination beam is projected onto a lateral surface of the target container, and the operational processor analyzes an illumination feature of the illumination beam inside the detection image to determine the target container is a transparent container or an opaque container.

5. The liquid providing system of claim 1, wherein the optical sensor utilizes different exposure parameters to respectively output a plurality of detection images.

6. The liquid providing system of claim 5, wherein the operational processor compares an image feature of the detection image with a feature threshold range, and decreases an exposure parameter of the optical sensor when the image feature is greater than the feature threshold range and further increases the exposure parameter when the image feature is equal to or smaller than the feature threshold range.

7. The liquid providing system of claim 5, wherein the operational processor utilizes a first exposure parameter and a second exposure parameter to alternately output a first detection image and a second detection image, and the first exposure parameter of the first detection image is greater than the second exposure parameter of the second detection image.

8. The liquid providing system of claim 7, wherein the operational processor analyzes the first detection image to detect a rim of the target container, and further analyzes the second detection image to decide a liquid height inside the target container.

9. The liquid providing system of claim 8, wherein the operational processor compares the liquid height with a predefined height condition, and adjusts a number ratio of the first detection image to the second detection image during a specific period in accordance with a comparison result.

10. The liquid providing system of claim 9, wherein the operational processor increases a number of the second detection image during the specific period when the liquid height conforms to the predefined height condition.

11. The liquid providing system of claim 9, wherein the operational processor only utilizes the second exposure parameter to output the second detection image when the liquid height conforms to the predefined height condition.

12. The liquid providing system of claim 1, further comprising:
    a liquid injector disposed on the main body and above the supporting platform and adjacent to the optical sensor, and adapted to inject liquid into the target container.

* * * * *